US012723664B2

(12) United States Patent
Jamieson

(10) Patent No.: US 12,723,664 B2
(45) Date of Patent: Sep. 1, 2026

(54) VALVE APPARATUS

(71) Applicant: JB VALVES LIMITED, Huddersfield (GB)

(72) Inventor: Alexander Stuart Jamieson, Huddersfield (GB)

(73) Assignee: JB VALVES LIMITED, Huddersfield (GB)

( * ) Notice: Subject to any disclaimer, the term of this patent is extended or adjusted under 35 U.S.C. 154(b) by 376 days.

(21) Appl. No.: 18/282,481

(22) PCT Filed: Mar. 3, 2022

(86) PCT No.: PCT/GB2022/050566
§ 371 (c)(1),
(2) Date: Sep. 15, 2023

(87) PCT Pub. No.: WO2022/195249
PCT Pub. Date: Sep. 22, 2022

(65) Prior Publication Data

US 2024/0044411 A1 Feb. 8, 2024

(30) Foreign Application Priority Data

Mar. 15, 2021 (GB) ..................................... 2103584

(51) Int. Cl.
*F16K 5/06* (2006.01)
*F16K 1/04* (2006.01)
(Continued)

(52) U.S. Cl.
CPC .............. *F16K 5/0694* (2013.01); *F16K 1/04* (2013.01); *F16K 5/0626* (2013.01);
(Continued)

(58) Field of Classification Search
CPC .... F16K 5/0694; F16K 5/0626; F16K 5/0647; F16K 27/067; F16K 1/04; F16K 27/02
(Continued)

(56) References Cited

U.S. PATENT DOCUMENTS 3,195,560 A * 7/1965 Pofit ....................... F16K 5/208 251/315.08
3,336,938 A * 8/1967 Schenck, Jr. ......... F16K 27/067 264/153
(Continued)

FOREIGN PATENT DOCUMENTS

GB 2 186 952 A 8/1987

OTHER PUBLICATIONS

International Search Report and Written Opinion issued for PCT App No. PCT/GB2022/050566 dated Jun. 27, 2022 (9 pages).

*Primary Examiner* — John Bastianelli
(74) *Attorney, Agent, or Firm* — Foley & Lardner LLP

(57) ABSTRACT

A valve apparatus comprises a valve member moveable for controlling flow through a fluid carrying bore. The valve member comprises a valve element coupled to a stem element extending within a stepped stem bore in a stem body, the stem element projecting out from the stem body through a stem bore opening. The valve member is further provided with a pressure-energizable multi-element stem seal within the stem bore, the stem element having a profile which inhibits compete removal of the valve member through the stem bore opening.

12 Claims, 4 Drawing Sheets

(51) Int. Cl.
*F16K 27/02* (2006.01)
*F16K 27/06* (2006.01)

(52) U.S. Cl.
CPC ............ *F16K 5/0647* (2013.01); *F16K 27/02* (2013.01); *F16K 27/067* (2013.01)

(58) Field of Classification Search
USPC ............................................... 251/304–317.1
See application file for complete search history.

(56) References Cited

U.S. PATENT DOCUMENTS

| | | | | |
|---|---|---|---|---|
| 4,342,444 | A | 8/1982 | Sonderman | |
| 6,095,493 | A * | 8/2000 | Velan | F16K 5/0694 251/315.01 |
| 8,807,530 | B2 * | 8/2014 | Yang | F16L 47/02 251/315.11 |
| 8,905,375 | B2 * | 12/2014 | McCoy | F16K 27/067 251/315.1 |
| 9,546,736 | B2 | 1/2017 | Watanabe et al. | |

* cited by examiner

VALVE APPARATUS

CROSS-REFERENCE TO RELATED APPLICATIONS

This application is a U.S. National Phase Application under 35 U.S.C. § 371 of International Application No. PCT/GB2022/050566, filed on Mar. 3, 2022, which claims the benefit of and priority to GB Appl. No. 2103584.5 filed Mar. 15, 2021, each of which is incorporated herein by reference in their entirety for any and all purposes.

TECHNICAL FIELD

The present invention relates to valves, and particularly though not exclusively to ball valves.

BACKGROUND

In this connection, ball valves traditionally use multi-element stem packing/sealing arrangements that are installed from the outside of the valve and utilise a packing gland to compress the seals. The gland requires routine adjustment to combat seal wear and maintain sufficient sealing capability of the stem packing.

This arrangement is not however conducive to subsea applications where routine maintenance is not possible and project specifications often dictate anti-blowout stem arrangements. Such anti-blowout stem arrangements aim to prevent the internal components of the valve being ejected under pressure when the gland is removed, which can be dangerous and cause environmental damage.

SUMMARY

According to the present invention there is provided valve apparatus comprising:—a valve member moveable for controlling fluid flow through a fluid carrying bore; the valve member comprising a valve element coupled to a stem element extending within a stepped stem bore in a stem body, the stem element projecting out from the stem body through a stem bore opening; the valve member further being provided with a pressure-energizable multi-element stem seal within the stem bore; the stem element having a profile which inhibits compete removal of the valve member through the stem bore opening.

By way of this arrangement, the packing gland component of known arrangements is eliminated, leak paths are reduced, no routine adjustments are required, seal integrity is increased, and environmental impact of potential leaks are reduced.

Preferably, the stem element has a stepped portion, such as a flange for engaging a stem bearing.

Preferably, the stem bearing engages a step in the stem bore and the pressure-energizable multi-element stem seal so that the pressure-energizable multi-element stem seal is held within stem bore.

Preferably the valve member is rotatably mounted within the stem bore.

Preferably, the valve element is rotatable, the valve element having a valve element bore that on rotating the valve element can align with the fluid carrying bore to allow flow there-through.

Preferably, the valve element is rotationally coupled to the stem element so that rotation of the stem element results in rotation of the valve element.

Preferably, the stem element takes the form of a rod-like element having the flange provided inward of one end, the flange engaging with the valve element, the one end of the rod-like element adjacent the flange being received in a recess in the valve element.

Preferably the stem bearing is provided around the rod-like element between the pressure-energizable multi-element stem seal and the flange.

Preferably, an actuator acts on the stem element portion that extends out of the body to move the valve member within the body Preferably, the valve element is a ball valve or a needle valve.

Preferably, the stem bore has at least 3 steps, progressively reducing the stem bore diameter from the fluid carrying bore to the stem bore opening.

Preferably, the first step houses a bearing for the valve element.

Preferably, the second step houses the stem bearing.

Preferably, the third step confines the upper end of the pressure-energizable multi-element stem seal.

Preferably, the stem element bore has one or more ingress seals at or adjacent the exit of the stem element from the body.

Preferably, the stem element is an anti-blowout stem, the relative diameters of the flange and stem bearing impeding the path of the stem element out of the stem bore.

Preferably, the pressure-energizable multi-element stem seal comprises a multi-element chevron seal set which is pressure energised and internally loaded.

Preferably, the fluid carrying bore extends through the stem body, the stem body having a loading bore aligned with and on the opposing side of the valve element from the stem element, the loading bore housing a loading member for loading and retaining the components of the valve member.

Preferably, the stem body is removably mountable within a housing through which is provided the fluid carrying bore.

In doing so the packing gland component of known arrangements is eliminated, leak paths are reduced, no routine adjustments are required, seal integrity is increased, environmental impact of potential leaks are reduced, the arrangement is anti-blowout, dangers and hazards are reduced and safety is increased.

According to a further aspect of the present invention there is provided a method of assembling a valve apparatus, the apparatus comprising; a body having a fluid carrying bore for fluid flow there-through, a valve member comprising a trunnion and a stem element, a stepped stem bore for housing the stem element; a loading bore; and a loading member; the method comprising the steps:—inserting the valve member through the loading bore so that it passes through the fluid carrying bore and into the stepped stem bore opposing the loading bore, the stem element having a flange that limits the extent to which the valve member can pass through the stepped stem bore; and loading the valve member by way of the loading member introduced into the loading bore.

Preferably, the method further comprises the step of introducing trunnion support members via the fluid carrying bore to support either side of the trunnion.

Preferably, the method further comprises inserting suitable seals and bearings into the stepped stem bore prior to introducing the valve member.

BRIEF DESCRIPTION OF THE DRAWINGS

An embodiment of the present invention will now be described by way of example and with reference to the accompanying drawings, of which:—

DETAILED DESCRIPTION

Figure 1:
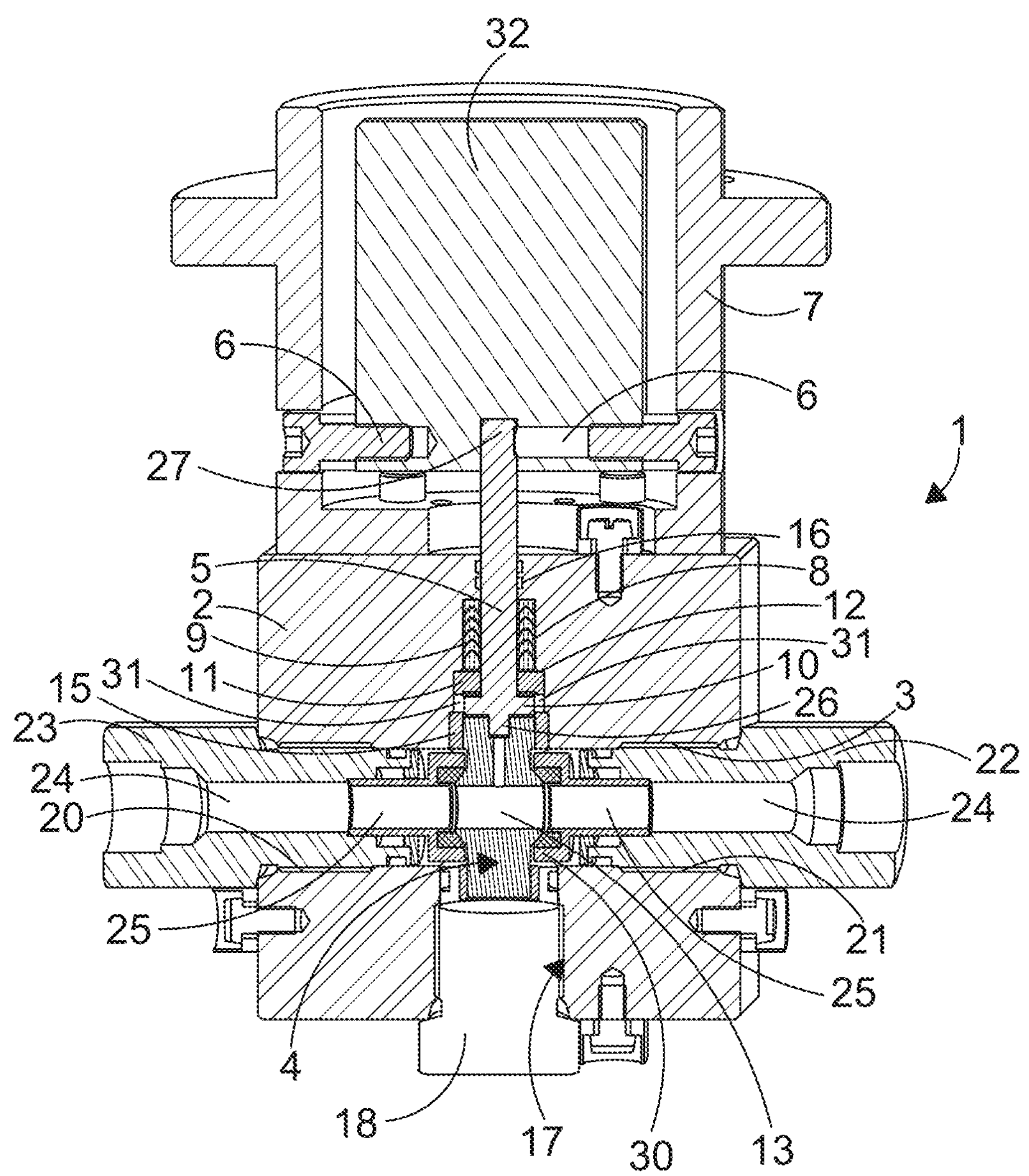
FIG. 1 shows a cross-sectional view through valve apparatus of an embodiment of the present invention.

As shown in FIG. 1, valve apparatus 1 comprises a body 2 having a main fluid carrying through bore 3 having ports 20, 21 into which are coupled connectors 22, 23. The connectors 22, 23 each have a connector bore 24 to allow flow of fluid through the valve apparatus.

A valve member 4 is rotatably housed within the main though bore to control flow of fluid through the bore. The valve member 4 comprises a valve element or trunnion 13 and a stem element 5 that extends out of the body through an opening at the top of the body 2 to engage paddle 32 provided within receptacle or bucket 7. The paddle and bucket are configured to be engaged by, for example, an ROV to apply a rotational force to open or close the valve apparatus.

The stem element 5 extends in a stepped stem bore 8 in the body, the stem element being supported within the stem bore with a pressure-energizable multi-element stem seal 9. The stem element 5 has a flange 10 for engaging a stem bearing 11.

The stem bearing 11 engages both a step 12 in the stem bore and the pressure-energizable multi-element stem seal 9 so that the pressure-energizable multi-element stem seal is held securely within stem bore. A spacer washer 31, preferably formed of PTFE, assists to facilitate rotational movement of the stem element 5.

Figure 3:
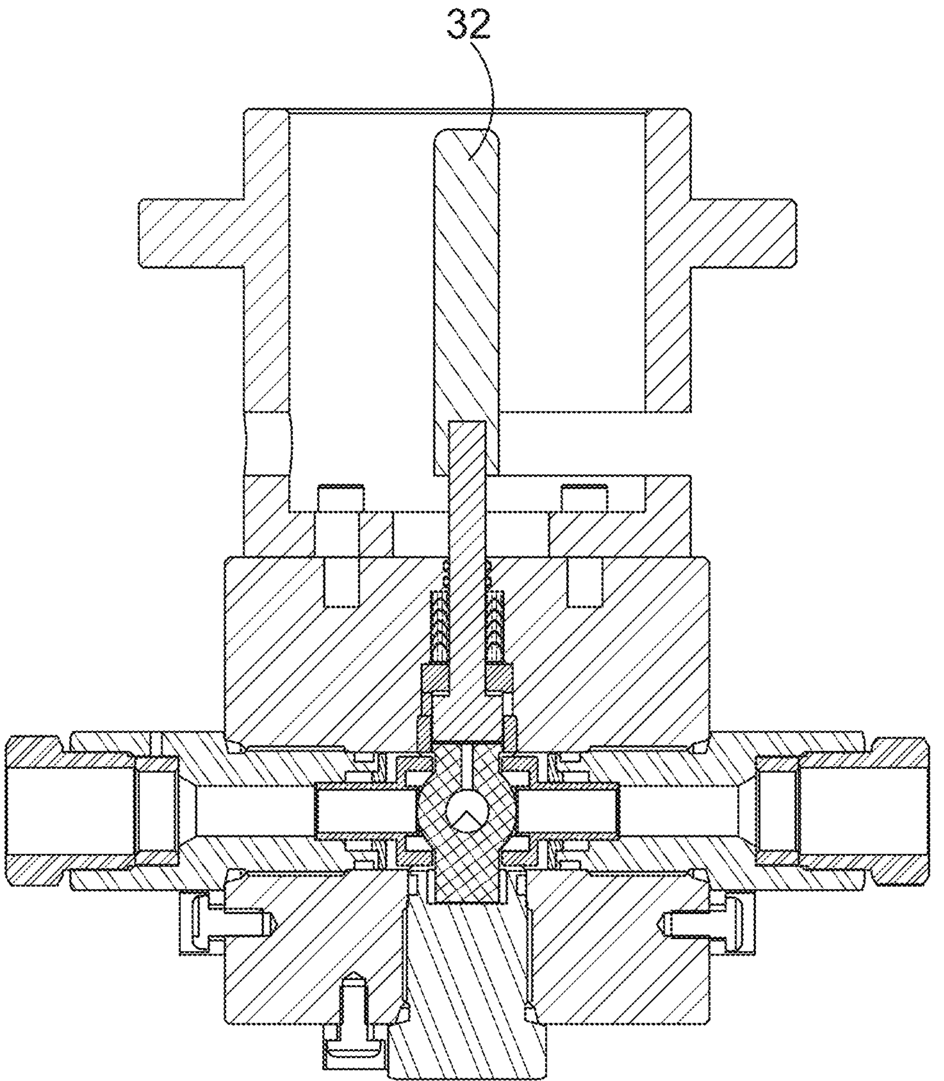
FIG. 3 shows cross-sectional view through valve apparatus of an embodiment of the present invention in a closed configuration.

The valve member 4 is as such rotatably mounted and comprises the rotatable valve element 13 provided in the bore, the valve element itself having a valve element bore 14, shown in FIG. 3, which on rotating the valve element can align with the bores 25 provided in valve element support members 30, between which the valve element 13 is rotatably mounted. In this regard, the support members bores 25 align with the connector bores 24 such that when the valve element is suitably aligned, flow is permitted through the valve apparatus.

The support members 30 are resiliently urged into engagement with the valve element 13 from either side of the allowing it to rotate whilst supporting it in place.

The valve element 13 is coupled to the stem element 5 so that rotation of the stem element results in rotation of the valve element. In this regard, the stem element takes the form of a rod-like element having the flange 10 provided slightly inward of one end, so that on assembly, the flange engages with the valve element 13, the one end of the rod-like element adjacent the flange being received in a slot recess 26 in the valve element. The end of the rod-like element has a flat planar profile to engage in the slot in order to apply rotational torque from the stem element to the valve element.

The stem bearing 9 is provided around the rod-like element between the pressure-energizable multi-element stem seal 9 and the flange 10.

Limiters 6 define the extent of rotational movement of the stem element 5 which is driven by way of the paddle 32.

In this embodiment, the valve element or trunnion 13 is a ball valve, but other suitable valve elements such as a needle valves may be employed where appropriate.

As shown, the stem bore 8 has 3 steps in the upper section of the bore, progressively reducing the stem bore diameter from the main bore to where the stem bore exits the body. The first step houses a bearing 15 for the valve element. The second step houses the stem bearing 11. The third step confines the upper end of the pressure-energizable multi-element stem seal 9.

The stem element bore 8 has one or more ingress seals 16 at or adjacent the exit of the stem element 5 from the body 2.

In this regard, the stem element 5 is constructed as an anti-blowout stem, the relative diameters of the flange 10 and stem bearing 11 impeding the path of the stem element out of the stem bore 8.

In this connection, the body 2 has a loading bore 17 aligned with the stem bore 8, the loading bore being on the opposing side of the valve element 13 from the stem element 5. The loading bore houses a loading member 18 for loading and retaining the components of the valve member.

The pressure-energizable multi-element stem seal comprises a multi-element chevron seal set which is pressure energised and internally loaded using the loading member 18. In the present embodiment, the body and all the pressure retaining components are made from 316SS, the soft seals are rubber, the seals on the ball are PEEK, the back-up rings are PTFE.

By way of this arrangement, the packing gland component of known arrangements is eliminated, leak paths are reduced, no routine adjustments are required, seal integrity is increased, and environmental impact of potential leaks are reduced.

The arrangement is anti-blowout, so that dangers and hazards are reduced and safety is increased.

To assemble the valve apparatus, the valve member 4, including the valve element/trunnion 13 and the stem member 5 is introduced via the loading bore 17, the seals 16, the stem bearing 11, the pressure-energizable multi-element stem seal 9; spacer washer 31 and bearing 15, all being in place to receive the valve element.

The valve element 4 is as such raised upwardly into place, in the context of FIG. 1 until further upward movement is prevented by engagement of the flange 10 with the bearing 11 and seal 9.

In this configuration, the valve element 13 effectively floats within the bore. The support members 30 are then moved into engagement to encompass the valve element as shown in the Figures. The loading member 18 can then be used to load the components from below.

Figure 2:
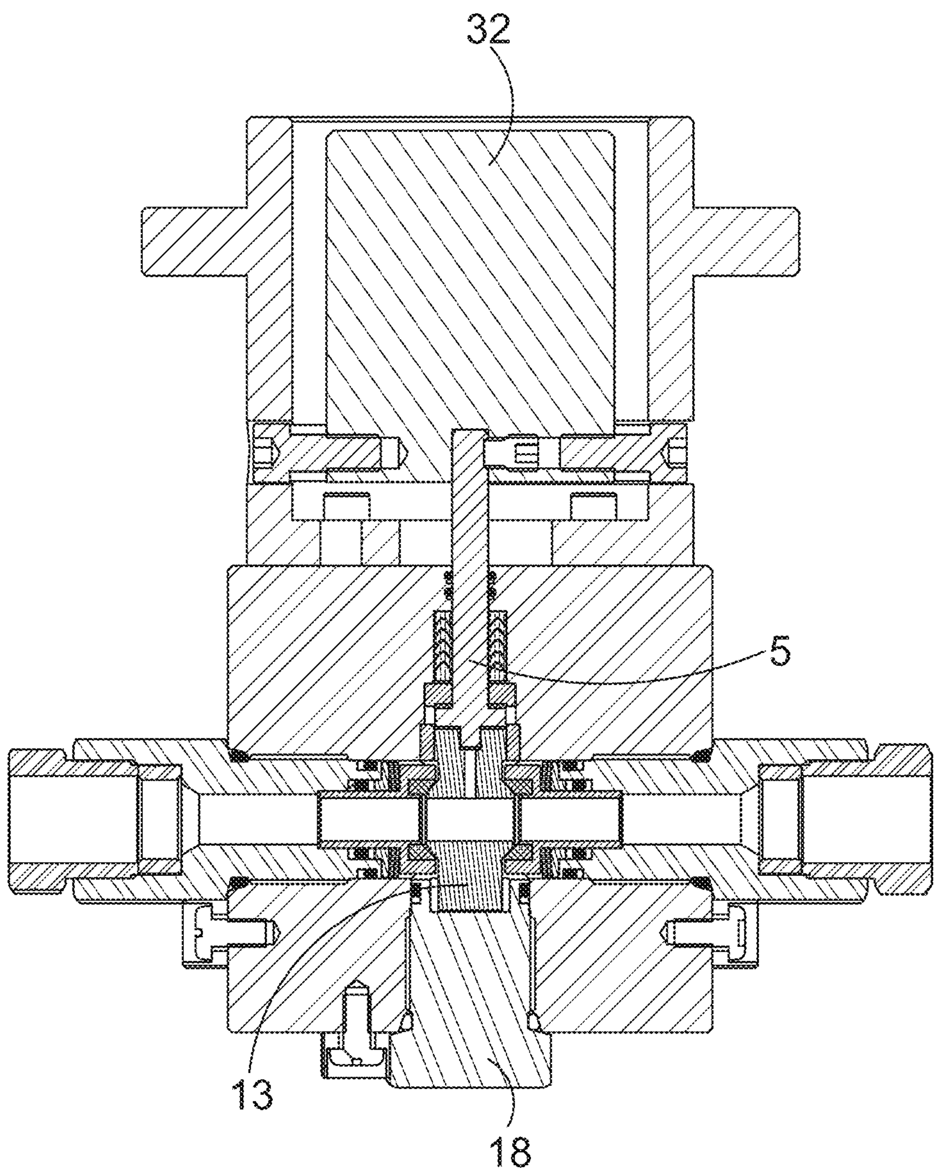
FIG. 2 shows cross-sectional view through valve apparatus of an embodiment of the present invention in an open configuration.

In operation of the valve apparatus, an ROV for example, engages paddle 32 which is to the stem element which can apply a rotational force to open or close the valve apparatus. The limiters 6 define the limits of rotation of the stem element. FIG. 2 in this regard shows the valve apparatus in an open state, whilst FIG. 3 shows the valve apparatus in a closed state.

In FIG. 2 the trunnion bore 14 is aligned with the support member bores 25 to allow flow of fluid. However, should the valve apparatus need to be closed, an ROV can be dispatched to engage with paddle 32 to rotate the trunnion to the state shown in FIG. 3, where the flow is impeded.

Figure 4:
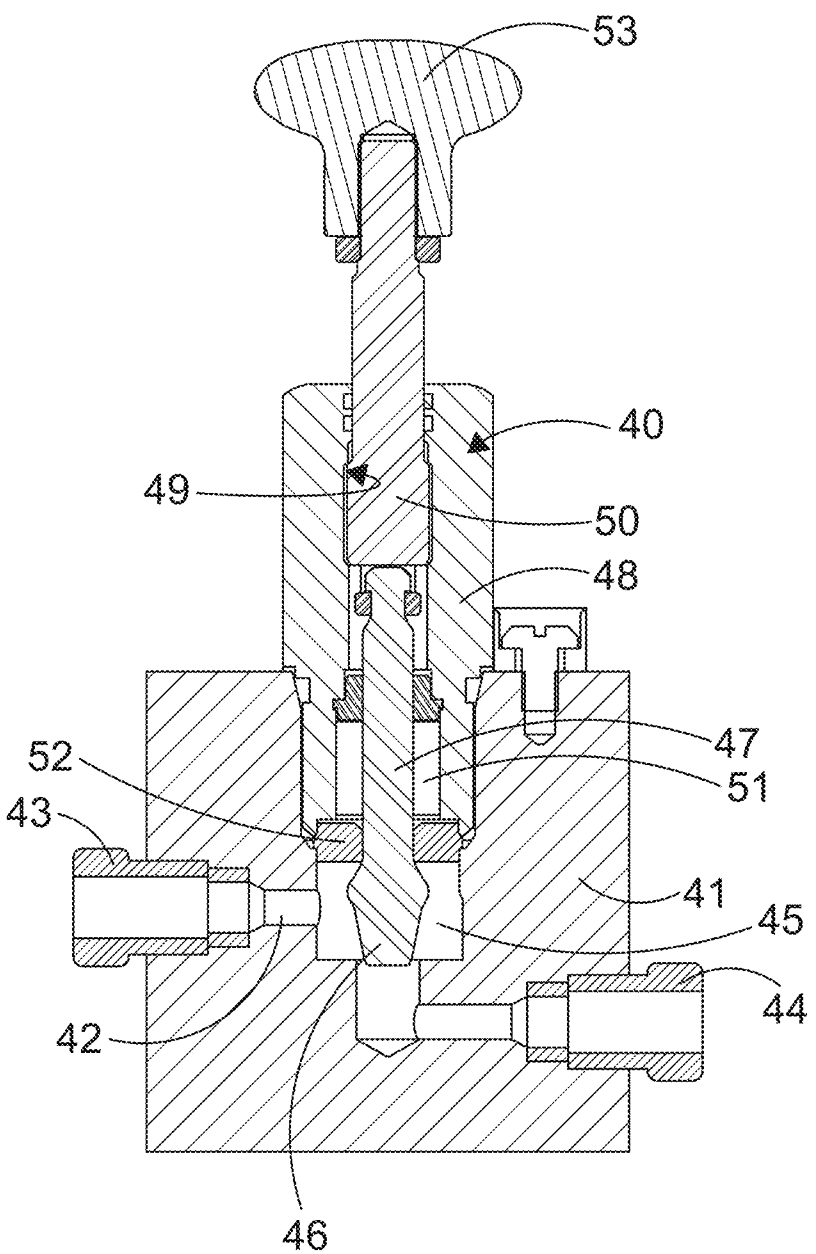
FIG. 4 shows a cross-sectional view through valve apparatus of a further embodiment of the present invention.

FIG. 4 shows a further embodiment of the present invention, where the valve apparatus takes form of cartridge 40, that is itself removably received within a fluid block housing 41 having a fluid carrying bore 42 there-through, the fluid carrying bore including couplings 43 and 44 that communicate with a recess 45 into which a flow control valve tip 46 of valve element 47 can travel to regulate flow through the bore. The cartridge includes a stem body 48 having a stepped stem bore 49 which receives the stem element 50. The stem body is engaged with fluid block housing 41 such that the stem body 48 and fluid block housing together are equivalent to the main body 2 of the first embodiment.

As with the first embodiment, a pressure-energizable multi-element stem seal (a chevron seal) 51 is provided and this can be loaded by way of locking element 52.

Actuation of nut 53 raises and lowers the stem element 50 within the stem body (bonnet) 48 thereby raising or lowering the valve tip 46 to regulate fluid flow through the fluid carrying bore.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention are described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the scope of the present invention. Accordingly, each example herein should be understood to have broad application, and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

The invention claimed is:

1. Valve apparatus comprising:

a fluid carrying bore;

a valve member moveable for controlling flow through the fluid carrying bore;

the valve member comprising a valve element coupled to a stem element extending within a stepped stem bore in a stem body, the stem element projecting out from the stem body through a stepped stem bore opening;

the valve member further being provided with a pressure-energizable multi-element stem seal within the stepped stem bore;

the stem element having a profile which inhibits compete removal of the valve member through the stepped stem bore opening, wherein the stem element has a stepped portion which engages a stem bearing, and wherein the stem bearing engages both a step in the stepped stem bore and the pressure-energizable multi-element stem seal so that the pressure-energizable multi-element stem seal is held within the stepped stem bore.

2. Valve apparatus as claimed in claim 1, wherein the valve member is rotatably mounted within the stepped stem bore.

3. Valve apparatus as claimed in claim 1, wherein the valve element is rotatable, the valve element having a valve element bore that on rotating the valve element can align with the fluid carrying bore to allow flow there-through.

4. Valve apparatus as claimed in claim 1, wherein the valve element is rotationally coupled to the stem element so that rotation of the stem element results in rotation of the valve element.

5. Valve apparatus as claimed in claim 1, wherein the stem element takes the form of a rod-like element having a flange provided inward of one end, the flange engaging with the valve element, the one end of the rod-like element adjacent the flange being received in a slot-like recess in the valve element.

6. Valve apparatus as claimed in claim 5, wherein the stem bearing is provided around the rod-like element between the pressure-energizable multi-element stem seal and the flange.

7. Valve apparatus as claimed in claim 1, wherein the stepped stem bore has at least 3 steps, progressively reducing the stepped stem bore diameter from the fluid carrying bore to stepped stem bore opening.

8. Valve apparatus as claimed in claim 1, wherein the pressure-energizable multi-element stem seal comprises a multi-element chevron seal set which is pressure energised and internally loaded.

9. Valve apparatus as claimed in claim 1, wherein the fluid carrying bore extends through the stem body, the stem body having a loading bore aligned with and on the opposing side of the valve element from the stem element, the loading bore housing a loading member for loading and retaining the components of the valve member.

10. A method of assembling a valve apparatus, the apparatus comprising:

a body having a fluid carrying bore for fluid flow therethrough;

a valve member comprising a trunnion and a stem element;

a stepped stem bore for housing the stem element;

a loading bore; and a loading member;

the method comprising the steps:

inserting the valve member through the loading bore so that it passes through the fluid carrying bore and into the stepped stem bore opposing the loading bore, the stem element having a flange that limits the extent to which the valve member can pass through the stepped stem bore; and loading the valve member by way of the loading member introduced into the loading bore, wherein the stem element has a stepped portion which engages a stem bearing and wherein the stem bearing engages both a step in the stepped stem bore and a pressure-energizable multi-element stem seal so that the pressure-energizable multi-element stem seal is held within the stepped stem bore.

11. The method of claim 10, comprising the further step of introducing trunnion support members via the fluid carrying bore to support either side of the trunnion.

12. The method of claim 10, comprising inserting suitable seals and bearings into the stepped stem bore prior to introducing the valve member.

* * * * *